Nov. 12, 1957  A. W. NELSON  2,812,700
GARDEN TOOL
Filed Sept. 23, 1954
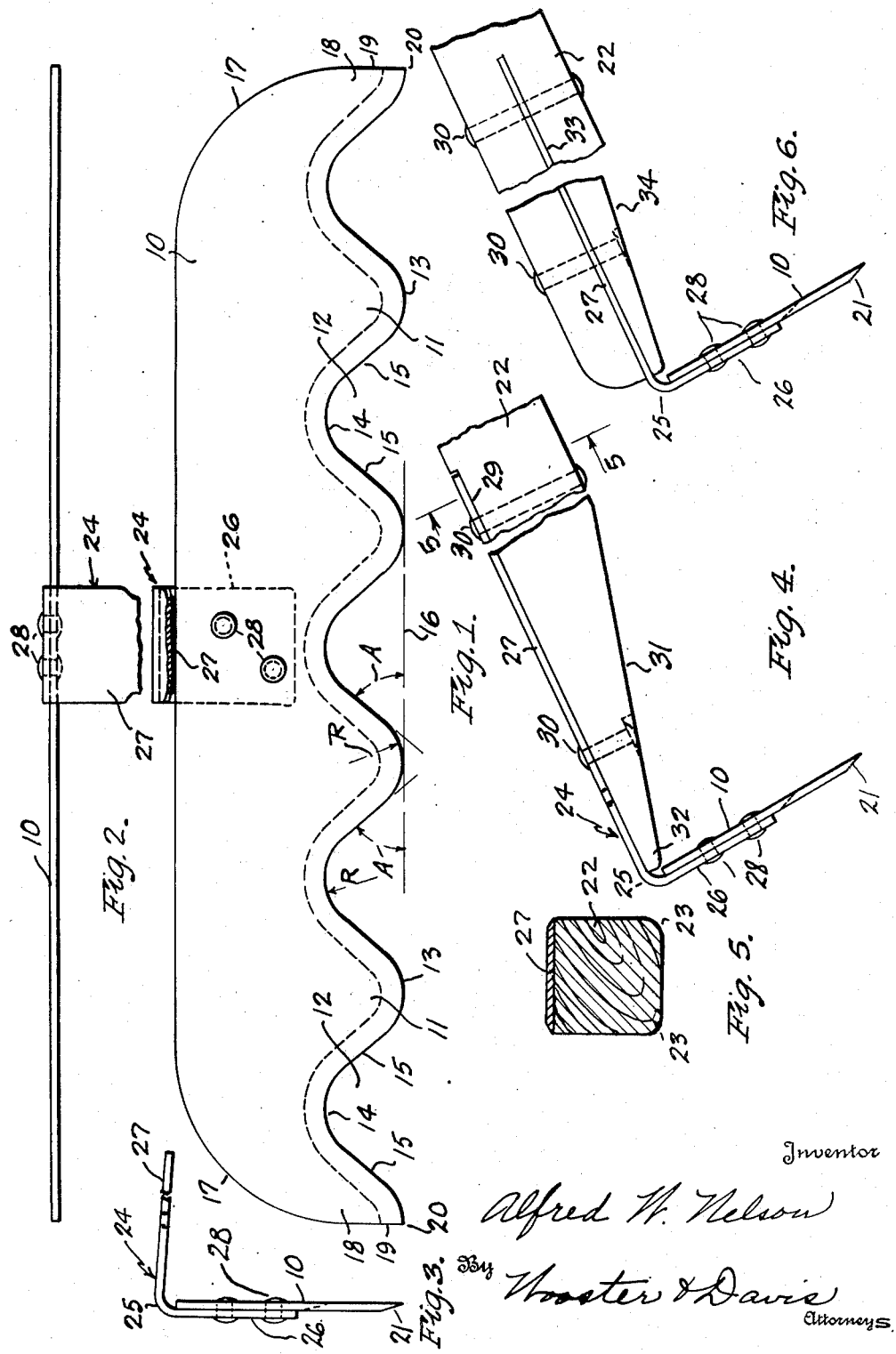
Inventor
Alfred W. Nelson
By Wooster & Davis
Attorneys

United States Patent Office 2,812,700
Patented Nov. 12, 1957

2,812,700

GARDEN TOOL

Alfred W. Nelson, Newtown, Conn.

Application September 23, 1954, Serial No. 457,980

2 Claims. (Cl. 97—71)

This invention relates to a garden tool, particularly to a hoe type of tool for working the surface of the soil and destroying weeds, and has for an object to provide an improved type of tool of this character which will be very effective in working up the soil and destroying weeds, both by rooting them up or cutting them off and exposing them to the sun.

Another object is to provide an improved shape of blade for this type of tool, which will be relatively long and narrow so that in use the soil can flow over it instead of piling up in front of it as it is drawn forwardly through the soil, and will therefore operate more with a drawing action, rather than as a chopping action as with the regular type of hoe.

It is also an object to provide an improved form and shape of cutting edge for this type of tool, and to so shape the ends of the blade that it may be worked in under the leaves of plants to get close to the stems of a plant, and also in which these ends are so shaped and arranged as to facilitate working of the soil and uprooting weeds close up to the stems.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a front view of the blade of this tool showing the handle securing means in section;

Fig. 2 is a top plan view thereof;

Fig. 3 is an end view looking from the left of Fig. 1;

Fig. 4 is an end view looking from the left of Fig. 1 showing one means of applying it to the operating handle;

Fig. 5 is a transverse section substantially on line 5—5 of Fig. 4, and

Fig. 6 is a view similar to Fig. 4 showing a somewhat modified arrangement.

The preferred form of the device, as shown in the drawing, comprises an elongated relatively narrow blade 10 of any suitable material, preferably spring steel, and is preferably substantially flat and of suitable thickness to give the required strength and stiffness, and also relatively narrow in width, for a purpose later to be described. It has an improved lower or cutting edge which is a material improvement and advance over the usual straight cutting edge for garden hose, which is easier to work and more effective in loosening and working up the soil than the normal straight edge, and is also more effective and easier to operate in cutting off or rooting up weeds, and therefore destroying them by exposing them to the sun. As shown in the drawing, this improved cutting edge comprises a scalloped edge comprising longitudinally spaced teeth 11 separated by recesses 12. The free ends 13 of the teeth are convexly curved, while the inner ends 14 of the recesses are similarly concavely curved. It is preferred that these curves be substantially on the arcs of circles, and they are shown as connected by short straight lines 15 which are tangent to the curves 13 and 14 and form the side edges of the teeth, which of course are also the side edges of the recesses. The dimensions may be varied, but it is preferred that the radius of the free ends of the teeth and the bottoms of the recesses, as indicated at R, be about one-half inch, and that the straight lines 15 forming the side edges of the teeth be at an angle of about fifty degrees to the line 16 joining the free ends of the teeth, as indicated at A in Fig. 1. It is also preferred that the length of the teeth be about three-quarters of an inch, and that the spacing be about two inches from center to center. It is also preferred that the blade be about ten inches in length, and from about two to two and one-quarter inches in width, and about one-sixteenth of an inch thick, although, as previously indicated, these dimensions may be varied as found desirable.

The upper edge of the blade at its outer or free ends is convexly curved, as shown at 17, or that is, rounded on a relatively large radius curve, to permit insertion of the ends of the blade under the leaves of the plant to a position close to the stems of the plant, and to facilitate working of the soil close to these stems the ends of the blade each comprise a substantially half tooth 18. That is, this tooth is substantially the size and width of one half of the intermediate teeth 11, giving a short straight upright end edge 19 running into the curved end edge portion 17 and terminating at its lower end in a sharp point 20 on the cutting edge of the blade. This provides a very effective structure for working the soil and rooting out weeds close up to the stems of the plants and under the lower leaves. To give a sharp cutting edge for the scalloped lower edge of the blade it is sharpened by bevelling on the rear side, as shown at 21.

The blade may be secured to a suitable handle for operating and using the tool, which is preferably an elongated substantially square wooden handle 22 with its corners or edges rounded, as indicated at 23. This gives a better grip on the handle both for the normal use of the tool with the blade in a horizontal position, as well as providing a better and firmer grip when the blade is used in a laterally inclined or tipped position, as, for example, for digging deeper with the end portions. The preferred means of fastening the blade to the handle is by an angular bracket 24 comprising a substantially flat metal strip bent at an angle adjacent one end, as indicated at 25, forming a shorter portion 26 and a longer portion 27. The shorter portion is secured to the blade, preferably to the rear side thereof adjacent its upper edge, by any suitable means, such, for example, as the rivets 28, and the longer upper portion 27 is secured to the lower end of the handle 22. In the form shown in Fig. 4, the top wall of the handle is recessed at its lower end, as indicated at 29, and this portion 27 is seated in this recess and secured by any suitable means, such as the rivets 30. The lower side of the handle at this end adjacent the blade is tapered, as indicated at 31, with its narrowest portion 32 adjacent the blade to provide clearance between the end of the handle and the blade for the soil, weeds, and so forth.

A modified arrangement is shown in Fig. 6, in which the end of the handle is transversely slotted, as indicated at 33, with the longer portion 27 of the bracket seated in this slot and then secured by the rivets 30. The under side of the handle is tapered, as shown at 34, the same as shown at 31 in Fig. 4, to provide clearance in the same manner. The angle between the two portions 26 and 27 is preferably somewhat less than a right angle to provide the proper inclination to the blade 10 in use, substantially that indicated in Figs. 4 and 6.

It will be clear from the above that this shape and arrangement of blade is a material improvement over the standard form of wide, straight-edged blade of the standard hoe in working up the soil and destroying weeds, both by loosening and breaking up the soil and by rooting up and exposing the weeds to the sun. The elongated, relatively narrow blade facilitates drawing it through the soil and permits the soil during this operation to flow over the top of the blade rather than be piled up in front of it, as is the action with the usual wide bladed, straight edged hoe. Also, the scalloped lower or cutting edge of the blade facilitates and increases the stirring-up and breaking-up action of the blade on the soil, as well as improving the uprooting action on the weeds, and the shape of the teeth also permits use of the tool with a sort of raking action, to loosen the weeds and separate their roots from the soil after they have been loosened or uprooted, as well as drawing the weeds out of the way and away from the plants to expose them to the sun. An important feature of this blade is the curved or rounded upper edge 17 on a relatively narrow blade in combination with the substantially half-tooth 18 forming the end of the blade and providing the sharp corners 20 at the ends of the cutting edge to facilitate digging out and uprooting weeds as well as breaking up or working the soil under the lower leaves of the plant and close up to the stems of the plants.

Having thus set forth the nature of my invention, I claim:

1. A garden tool of the character described comprising an elongated, narrow, substantially flat blade having a scalloped lower cutting edge providing a series of longitudinally spaced convexly curved relatively large teeth separated by similarly concavely curved relatively large recesses between them, the blade being about two to two and one-quarter inches in width, about four to five times the width in length, with the spacing between the tooth centers about the same as the width of the blade and their height about one-third of this width, the upper edge of the blade at the opposite outer ends thereof being rounded on a relatively large curve to permit insertion of these ends under the leaves of the plants close to the stems and the teeth at the ends of the blade being substantially one-half of the intermediate teeth in shape and width forming sharp pointed corners on the cutting edge at the outer end edges of the blade to permit action close to said stems, and an elongated handle extending forwardly from the upper edge of the blade.

2. A garden tool of the character described comprising an elongated, narrow, substantially flat blade having a scalloped lower cutting edge providing a series of longitudinally spaced covexly curved teeth separated by similarly concavely curved recesses between them, the upper edge of the blade at the opposite outer ends thereof being rounded on a relatively large curve to permit insertion of these ends under the leaves of the plant close to the stems, the blade being about two to two and one-quarter inches in width, about four to five times the width in length, with the spacing between the tooth centers about the same as the width of the blade and their height about one-third of this width, a substantially flat metal strip extending forwardly at an angle to the blade at the upper edge thereof, and a substantially square handle having rounded corners secured to said strip and tapered on its under side immediately in front of the blade with the thinnest part adjacent the upper edge of the blade for clearance.

References Cited in the file of this patent

UNITED STATES PATENTS

| | | |
|---|---|---|
| 319,183 | Boothby | June 2, 1885 |
| 900,871 | McCabe | Oct. 13, 1908 |
| 1,043,758 | Ferwerda | Nov. 5, 1912 |
| 1,291,327 | Wilbert | Jan. 14, 1919 |
| 1,390,797 | Lea | Sept. 13, 1921 |
| 1,793,290 | Pleas | Feb. 17, 1931 |

FOREIGN PATENTS

| | | |
|---|---|---|
| 405,735 | Great Britain | Feb. 15, 1934 |
| 234,703 | Switzerland | Feb. 1, 1945 |